United States Patent [19]

Sakai

[11] Patent Number: 5,281,880
[45] Date of Patent: Jan. 25, 1994

[54] ROTARY MACHINE

[76] Inventor: Hirozumi Sakai, 2-125, Honji-cho, Toyota-shi, Aichi, 471, Japan

[21] Appl. No.: 976,653

[22] Filed: Nov. 13, 1992

Related U.S. Application Data

[63] Continuation of Ser. No. 460,111, May 10, 1990, abandoned.

[30] Foreign Application Priority Data

Sep. 14, 1988 [JP] Japan .......................... 63-120665[U]

[51] Int. Cl.⁵ .......................................... H02K 23/60
[52] U.S. Cl. ........................ 310/115; 310/78; 310/91; 310/92; 310/232; 310/248; 192/48.2
[58] Field of Search ............. 310/177, 148, 120, 232, 310/121, 123, 128, 129, 130, 115, 116, 117, 118, 76, 78, 92, 100, 93, 77, 89, 91, 233, 254, 261; 192/48.2

[56] References Cited

U.S. PATENT DOCUMENTS

| | | | |
|---|---|---|---|
| 1,464,684 | 8/1923 | Stoppenbach | 310/115 |
| 1,720,731 | 7/1929 | Jones | 310/129 |
| 2,717,321 | 9/1955 | Stearns | 310/128 |
| 3,862,444 | 1/1975 | Hale | 310/115 |
| 4,130,172 | 12/1978 | Moody | 310/118 |
| 4,707,629 | 11/1987 | Wasko | 310/129 |

FOREIGN PATENT DOCUMENTS

| | | |
|---|---|---|
| 417741 | 10/1968 | Australia . |
| 484944 | 11/1975 | Australia . |
| 2840222 | 3/1979 | Fed. Rep. of Germany . |
| 2937754 | 4/1981 | Fed. Rep. of Germany . |
| 47-45761 | 11/1972 | Japan . |
| 50-34809 | 11/1975 | Japan . |
| 50-151315 | 12/1975 | Japan . |
| 0169353 | 9/1984 | Japan .......................... 310/115 UX |
| 0238446 | 9/1989 | Japan .......................... 310/172 |
| 0110486 | 1/1961 | Pakistan ........................ 310/92 |
| 2221802 | 2/1990 | United Kingdom ............. 310/92 |

OTHER PUBLICATIONS

Patent Abstracts of Japan, vol. 9, No. 23 (E-293) (1746) Jan. 30, 1985; JP-A-59 169353 (Tokyo Denki) Sep. 25, 1984.

Primary Examiner—R. Skudy
Attorney, Agent, or Firm—Armstrong, Westerman, Hattori, McLeland & Naughton

[57] ABSTRACT

The present invention relates to a rotary machine. Main technical problem is in that two rotating forces being different in the rotating direction are taken to the outside using one motor. Consequently, in the invention, a stator (3) is rotatably supported by a support body (2) and provided with an output shaft or an input shaft (34), and further static side and rotating side are electrically connected. The rotary machine according to the invention can be applied as the drive source of a load requiring the rotating force in different rotating direction, or can be applied as a generator by the power source of wide range and other wide use ranges.

5 Claims, 4 Drawing Sheets

Fig.2
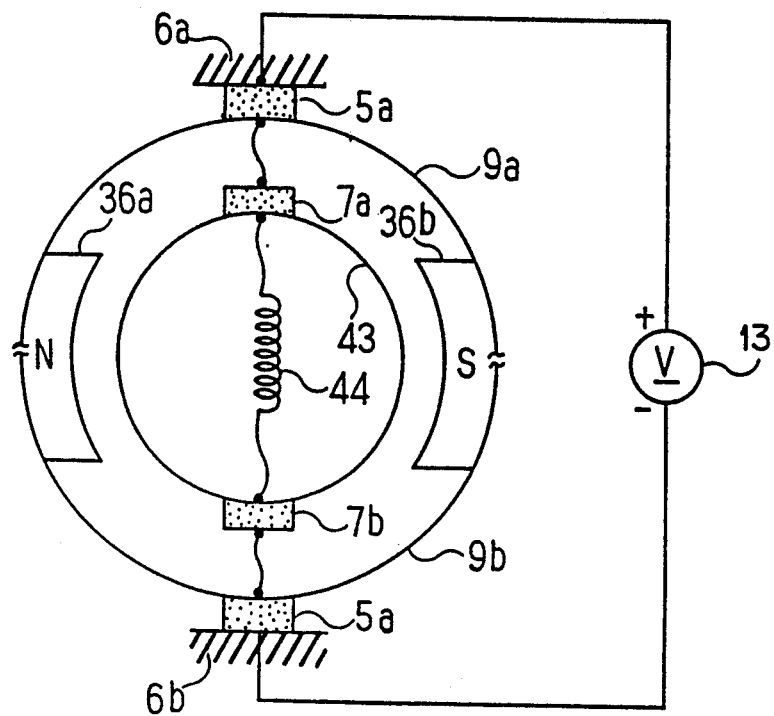
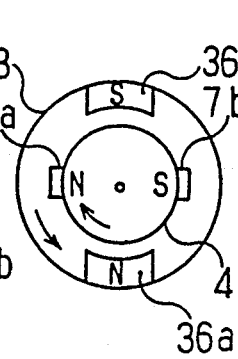 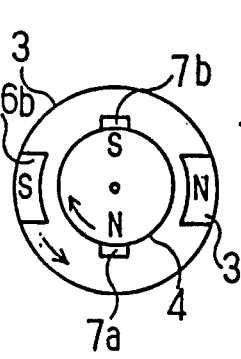 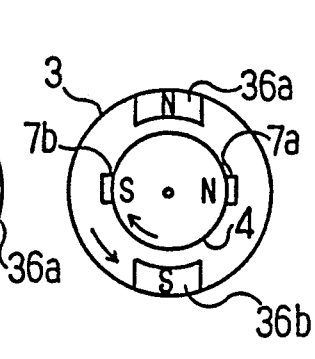
Fig.3(A)　　Fig.3(B)　　Fig.3(C)　　Fig.3(D)

ROTARY MACHINE

This application is a continuation of application Ser. No. 460,111 filed May 10, 1990, now abandoned.

TECHNICAL FIELD

The present invention relates to rotary machines and more particularly to a rotary machine where a stator is rotatable and rotating output of the stator is taken to the outside or rotating force can be supplied to the stator from the outside.

BACKGROUND ART

It is well known in the prior art that a rotary machine such as a motor, a stator is fixed and mounted to a support body (housing) and is not rotated.

Rotating motion of a rotor is performed in that magnetic repulsion and attraction force due to magnetic poles of the stator acts as torque on the rotor, and at the same time, the magnetic repulsion and attraction force due to magnetic poles of the rotor also acts on the stator. In the motor of the prior art, the force acting on the rotor is, so to speak, absorbed by the support body.

The inventor of the present invention pays attention to this force acting on the stator, and makes it the main problem that the force acts as torque on the stator, and in addition to the conventional rotating output of the rotor, new rotating output by the stator is also taken to the outside.

DISCLOSURE OF INVENTION

The present invention is in a rotary machine having a support body, a rotor and a stator, characterized in that the stator is rotatably supported by the support body and the stator is provided with an output shaft or an input shaft and further a power transmission mechanism to connect static side and rotating side electrically is installed to the stator and the support body.

BRIEF DESCRIPTION OF DRAWINGS

FIG. 2 is an electric equivalent circuit diagram of the embodiment;

FIGS. 3(A), 3(B), 3(C) and 3(D) are diagrams for explaining an operation of the embodiment of this invention;

BEST MODE FOR CARRYING OUT THE INVENTION

Figure 1:
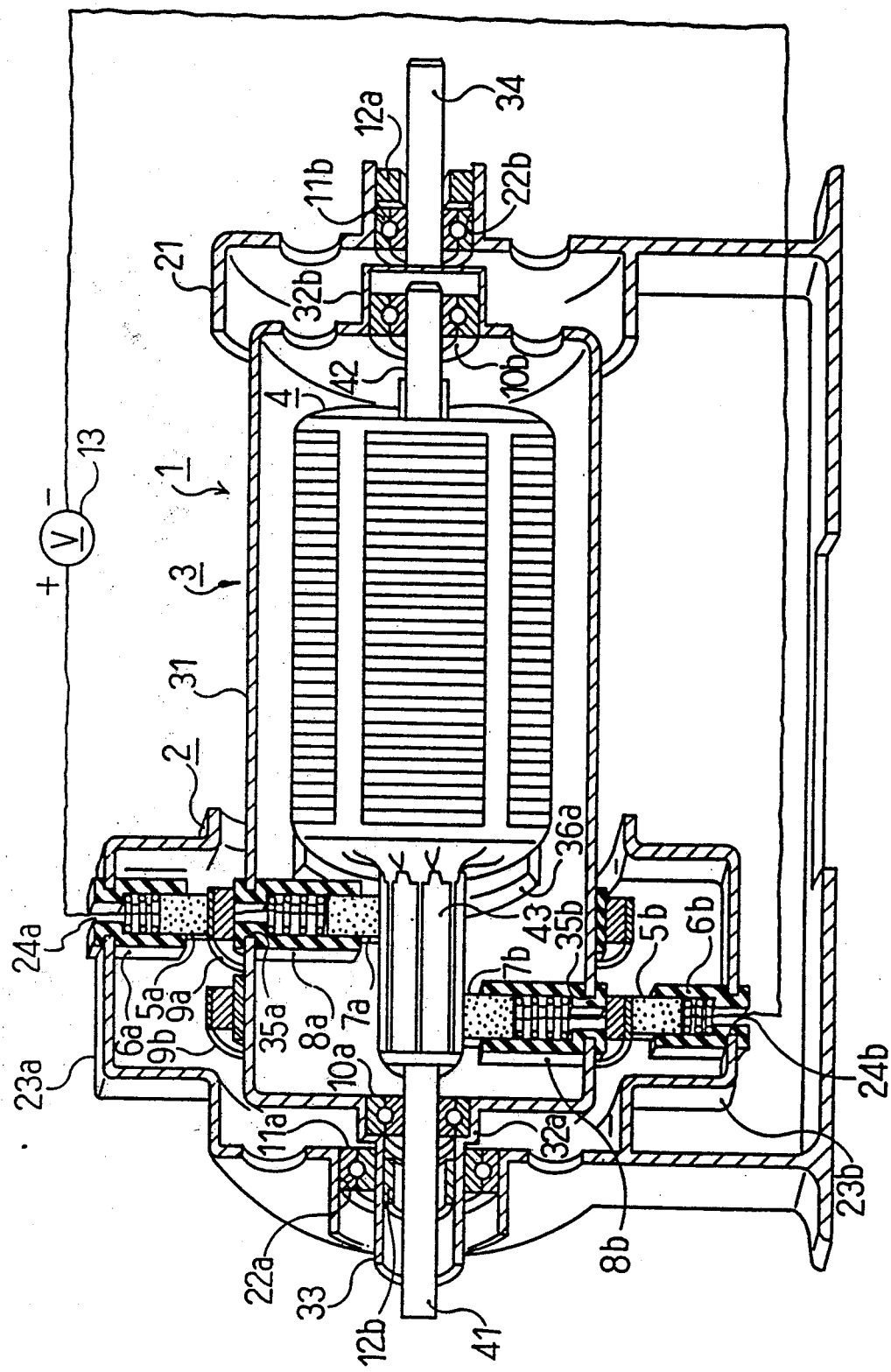
FIG. 1 is a sectional view of a rotary machine as an embodiment of the invention.

A rotary machine 1 shown in FIG. 1 ia s two-pole DC motor having a support body (or a housing) 2, a stator 3, a rotor 4, brushes (or housing brushes) 5a, 5b fixed to the housing 2, housing brush holders 6a, 6b, brushes (or stator brushes) 7a, 7b fixed to a stator body member 31, stator brush holders 8a, 8b, slip rings 9a, 9b, bearings (or rotor bearings) 10a, 10b for supporting the rotor 4, bearings (or stator bearings) 11a, 11b for supporting the stator 3, and clutch mechanisms 12a, 12b.

A drum-shaped body member 21 of the housing 2 is provided at its center portion of the left end surface with a hole 22a for mounting one stator bearing 11a, and on the other hand the body member 21 is provided at its center portion of the right end surface a hole 22b for mounting the other stator bearing 11b and the known clutch mechanism 12a. A housing brush enclosing member 23a is projected on upper left side of the body member 21, and other housing brush enclosing member 23b is projected on lower left side thereof respectively. The enclosing member 23a is provided with a housing brush holder mounting hole 24a, and other enclosing member 23b is provided with other housing brush holder mounting hole 24b along the axial line at suitable distance.

As further shown in FIG. 1, an enclosing member 32a for enclosing the rotor bearing 10a is projected at the center portion of the left end surface of the drum-shaped body member 31 of the stator 3, and a hollow cylindrical shaft 33 supported by the stator bearing 11a is projected at the left end portion of the enclosing member 32a for enclosing the clutch mechanism 12b. On the other hand, other rotor bearing enclosing member 32b is projected at the center portion of the right end surface of the body member 31, and an output shaft supported by other stator bearing 11b (stator output shaft) 34 is projected at the right end surface of the enclosing member 32b. The hollow cylindrical shaft 33 and the stator output shaft 34 are positioned on the same axis. Thus the stator 3 is rotatable with respect to the housing 2.

Stator brush holder mounting holes 35a, 35b are provided at the left side of the stator body member 31 respectively at the position on the axial line opposed to the housing brushes 5a, 5b and on the circumference having phase difference of 180°.

As shown in FIGS. 1, 2 and 3(A) through 3(D) magnets 36a, 36b to form N-pole and S-pole of two poles as the field system are fixed on the inner circumferential surface of the body member 31 (FIG. 1). The permanent magnets 36a, 36b have phase difference of 90° with respect to the stator brushes 7a, 7b.

A rotating shaft at the left end side of the rotor 4 (rotor output shaft) 41 is supported by the rotor bearing 10a, and a rotary shaft at the right end side (rotor rotating shaft) 42 is supported by other rotor bearing 10b. Consequently, the rotor 4 can be rotated independently of the rotation of the stator 3.

The housing brush 5a is electrically connected, for example, to the positive pole of the DC power source 13, and contacted slidably with the slip ring 9a installed in ring form to the stator drum-shaped body member 31. On the other hand, other housing brush 5b is electrically connected to the negative pole of the DC power source 13 and contacted slidably with other slip ring 9b. The slip ring 9a is electrically connected to the stator brush 7a, and other slip ring 9b is electrically connected to other stator brush 7b. The stator brushes 7a, 7b are contacted with a commutator 43 of the rotor 4. Consequently, the positive pole of the DC power source 13 supplies the positive voltage to the commutator 43 through the housing brush 5a, the slip ring 9a and the stator brush 7a, on the other hand, the negative pole supplies the negative voltage to the commutator 43 through other housing brush 5b, other slip ring 9b and other stator brush 7b, thereby armature current is supplied to an armature coil 44 (see, FIG. 2) of the rotor 4 and magnetomotive force is generated in the rotor 4.

The clutch mechanisms 12a, 12b are an electromagnetic clutch of one way type for example, and the electric power to be supplied to the clutch mechanism 12a is supplied thereto from the power source 13 through a switch circuit (not shown) directly, and the electric power to be supplied to clutch mechanism 12b is supplied thereto from switch circuit, the brush 5a, the slip ring 9a or 9b.

Next, operation of the rotary machine 1 in this constitution will be described. If the DC power source 13 is made to the rotary machine 1, the maguetomotive force is generated in the rotor 4 as above described. If the polarity of the generated magnetomotive force is as shown in FIG. 3(A) for example, the magnetic attraction and repulsion force is generated between the rotor 4 and the stator 3 and acts as the rotating force on the rotor 4 and the stator 3, thereby the rotor 4 and the stator 3 are started to rotate clockwise and counterclockwise respectively. When the power source 13 is turned on, both clutch mechanisms 12a, 12b are at interrupted state and the support body 2 and the stator 3 are freely rotatable relative to each other, and also the stator 3 and the rotor 4 are freely rotatable.

Since the stator brushes 7a, 7b are fixed to the stator 3 as above described, the stator brushes 7a, 7b are also rotated with the stator 3. Consequently, in the rotor 4, the rotating direction is clockwise but the generated magnetomotive force is rotated counter-clockwise at the same speed as the rotating speed of the stator 3 and the phase difference with the stator field system at the starting state is held. Therefore the magnetic attraction and repulsion force continues to provide the rotating force also after the starting is generated between the rotor 4 and the stator 3, and the rotor 4 and the stator 3 can be rotated clockwise and counterclockwise respectively as shown in sequence in FIGS. 3(B), 3(C) and 3(D).

When the DC power source 13 is made to the rotary machine 1 in this manner, as shown in sequence in, for example, FIGS. 3(B), 3(C) and 3(D), since the rotor 4 is rotated clockwise and the stator 3 is rotated counterclockwise, two rotating forces being different from each other in the rotating direction can be taken from the rotor output shaft 41 and the stator output shaft 34 to the outside.

When the clutch mechanism 12a is at the connection state, the stator 3 is fixed to the support body 2 and use as an ordinary motor also becomes possible. Coupling coefficients: (1) between the support body and the stator, and (2) between the stator and the rotor are adjusted by the clutch mechanisms 12a, 12b (e.g., coupling or non-coupling state), respectively; thereby, various output controls can be made. As shown in FIG. 1, the clutch mechanism 12b can be installed between the stator 3 and the output shaft 41 of the rotor 4.

In the embodiment, the rotor output shaft 41 is exposed from the housing end surface at the left side in the figure to the outside and the stator output shaft 34 is exposed from the housing end surface at the right side in the figure to the outside, but the taking-out method of the rotor output shaft 41 and the stator output shaft 34 to the outside is not limited to this. For example, both, output shafts 34, 41 may be taken from the same housing end surface, and each of the output shafts 34, 41 may be two output shafts respectively.

Figure 4:
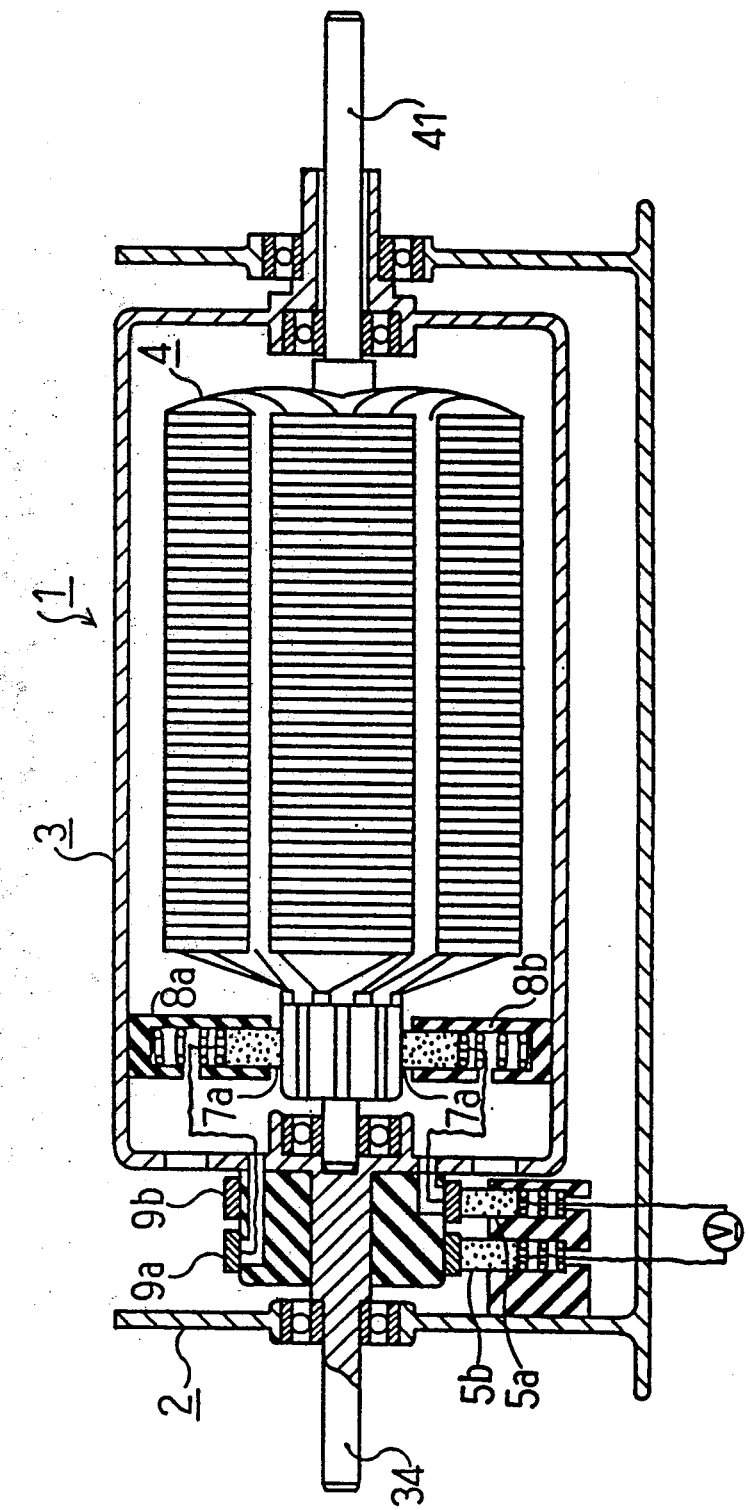
FIG. 4 is a sectional view of a rotary machine as another embodiment of the invention.

Also in the embodiment, the motor is shown where the stator 3 and the rotor 4 are enclosed within the housing 2, but as shown in FIG. 4, the stator 3 may be exposed to the outside and supported by the support frame (support body) 2. Reference numerals in FIG. 4 designate the same content as that of the above-mentioned embodiment.

Figure 5:
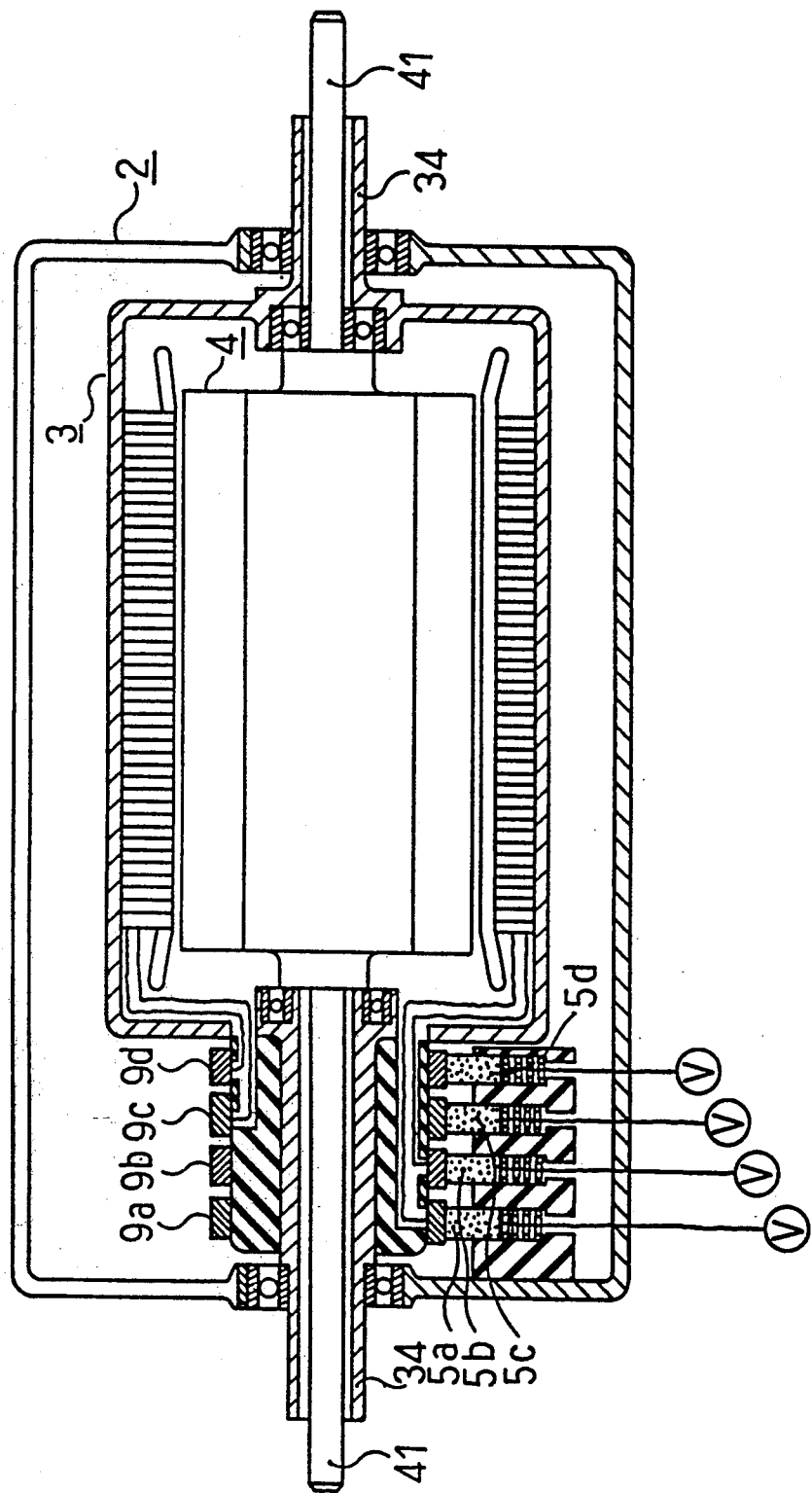
FIG. 5 is a sectional view of a rotary machine as still another embodiment of the invention.

As still another embodiment, the rotary machine may be made a brushless motor or a brushless generator as shown in FIG. 5. In FIG. 5, the rotor 4 is a permanent magnet or a cage rotor, and the stator 3 is a field winding (i.e., the stator 3 having field winding portions within a housing thereof). Among other reference numerals in FIG. 5, numerals 5a, 5b, 5c, 5d designate brushes, and numerals 9a, 9b, 9c, 9d designate slip rings.

In the first embodiment, the permanent magnet is used as the field system, but a field coil may be used in the field system as another embodiment. In this case, field current is supplied to the field coil through the slip rings 9a, 9b.

The first embodiment shows the two-pole DC motor, but it may be made a DC motor of multiple poles such as four poles freely as another embodiment.

The first embodiment shows the DC motor, but the invention, of course, can be simply used also as an AC commutator motor where a stator is rotatable.

The first embodiment shows the DC motor, but may be used also as a DC generator as it is. In this case, the rotor output shaft 41 and the stator output shaft 34 are, of course, made shafts supplied with the rotating force from the outside, i.e., input shafts.

In the first embodiment, the clutch mechanisms 12a and 12b are installed respectively between the support body 2 and the stator 3 and between the stator 3 and the rotor 4, but other clutch mechanism may be installed between the support body 2 and the rotor 4 freely. Also brake mechanisms may be installed in place of the clutch mechanisms 12a, 12b.

An electric deficiency portion may be provided in a part on the circumference of the slip rings 9a, 9b, and when torque acting between both output shafts 34, 41 attains to a prescribed value, a drive power source is turned off by the deficiency portion of the slip rings 9a, 9b, thereby the output shafts 34, 41 may be moved in rocking motion.

According to the invention as above described, in use as a motor, the rotating forces being different from each other in the rotating direction can be taken to the outside by one motor.

Consequently, one output shaft is controlled in rotation thereby other output shaft is controlled in rotation or the like, and the motor according to the invention can be applied to the field of wide range, such as an industrial robot.

The invention can be used as one generator having two input shafts, and can be applied as the generator by the power source of wide range.

While the invention has been particularly shown and described in reference to preferred embodiments thereof, it will be understood by those skilled in the art that changes in form and details may be made therein without departing from the spirit and scope of the invention.

I claim:

1. A rotary machine, comprising:
   a support body;
   a rotor;
   a stator;
   a power transmission means;
   a first clutch means, wherein said rotor and said stator are rotatably supported by said support body, and said power transmission means supplies power to one of said rotor and said stator so that said rotor and said stator are rotated in reverse directions to each other, and said first clutch means holds one of a coupling state and a non-coupling state between a shaft of said rotor and said stator; and another clutch means installed between said support body and said stator for actuating rotation of said stator relative to said support body.

2. A rotary machine as set forth in claim 1, wherein said rotary machine is a DC motor, and said power transmission means comprises brushes installed on said support body, and slip rings installed on said stator.

3. A rotary machine as set forth in claim 2, wherein said shaft of said rotor is rotatably supported by the stator.

4. A rotary machine as set forth in claim 1, wherein said rotary machine is an AC commutator motor, and said power transmission means comprises brushes installed on said support body and slip rings installed on said stator.

5. A rotary machine as set forth in claim 1, wherein said first clutch means is installed between said stator and said shaft of said rotor.

* * * * *